(12) United States Patent
Cooper

(10) Patent No.: US 9,283,595 B1
(45) Date of Patent: Mar. 15, 2016

(54) CONFIGURABLE CLEANING BRUSH

(71) Applicant: Jeffery T Cooper, Longwood, FL (US)

(72) Inventor: Jeffery T Cooper, Longwood, FL (US)

( * ) Notice: Subject to any disclaimer, the term of this patent is extended or adjusted under 35 U.S.C. 154(b) by 176 days.

(21) Appl. No.: 13/826,437

(22) Filed: Mar. 14, 2013

Related U.S. Application Data

(60) Provisional application No. 61/610,640, filed on Mar. 14, 2012.

(51) Int. Cl.
*A46B 3/18* (2006.01)
*B08B 1/00* (2006.01)
*A46B 3/00* (2006.01)
*A46B 5/00* (2006.01)
*B60S 3/04* (2006.01)

(52) U.S. Cl.
CPC . *B08B 1/002* (2013.01); *A46B 3/00* (2013.01); *A46B 5/002* (2013.01); *A46B 5/0045* (2013.01); *A46B 2200/3046* (2013.01); *B60S 3/045* (2013.01)

(58) Field of Classification Search
CPC .......... A46B 3/00; A46B 5/002; A46B 5/007; A46B 2200/3046; A46B 5/0045; B60S 3/045
USPC .......... 15/106, 160, 164, 172, 176.1
See application file for complete search history.

(56) References Cited

U.S. PATENT DOCUMENTS

| | | | | |
|---|---|---|---|---|
| 377,582 A * | 2/1888 | Stewart | ............................ | 15/106 |
| 872,595 A * | 12/1907 | Warshilsky | ..................... | 15/179 |
| 937,019 A * | 10/1909 | Bethsold | ......................... | 15/164 |
| 2,339,123 A * | 1/1944 | Volckening | ..................... | 15/164 |
| 2,606,338 A * | 8/1952 | De Lorenzo | .................... | 15/395 |
| 3,589,919 A | 6/1971 | Clifford | | |
| 3,613,140 A | 10/1971 | Oas | | |
| 4,118,820 A | 10/1978 | Bivens | | |
| 4,756,044 A | 7/1988 | Clark | | |
| 5,150,491 A | 9/1992 | Ikemoto | | |
| 5,168,593 A * | 12/1992 | Poje et al. | ..................... | 15/104.2 |
| 5,709,003 A * | 1/1998 | Batch | .............................. | 15/106 |
| 5,802,658 A * | 9/1998 | Ward | .............................. | 15/144.2 |
| 5,887,600 A * | 3/1999 | Wilk | .............................. | 132/262 |
| 5,927,290 A | 7/1999 | Thiruppathi | | |
| 6,298,515 B1 * | 10/2001 | Robinson | ........................ | 15/114 |
| 6,473,930 B1 * | 11/2002 | Ortega | ............................ | 15/211 |
| 6,543,388 B2 | 4/2003 | Willinger et al. | | |
| 6,964,077 B2 * | 11/2005 | Kadinger et al. | ........... | 15/104.03 |
| 7,473,046 B2 * | 1/2009 | Kraus et al. | .................... | 401/117 |
| 7,770,252 B2 * | 8/2010 | Errichiello et al. | ............. | 15/172 |
| 7,814,917 B2 | 10/2010 | Hurwitz | | |
| 8,020,239 B2 | 9/2011 | Pecora | | |
| 8,082,886 B2 | 12/2011 | Hurwitz | | |
| 8,365,338 B1 * | 2/2013 | Figaro | ............................ | 15/160 |
| 8,621,701 B2 * | 1/2014 | Meharry | ......................... | 15/106 |
| 2001/0055512 A1 | 12/2001 | Waddell | | |
| 2008/0109976 A1 * | 5/2008 | Sanabia | ......................... | 15/106 |
| 2009/0070951 A1 * | 3/2009 | Sever | ............................ | 15/143.1 |
| 2009/0282634 A1 * | 11/2009 | Pardini | ............................ | 15/172 |
| 2011/0225755 A1 * | 9/2011 | Carlson et al. | .................. | 15/145 |
| 2012/0060308 A1 * | 3/2012 | Zahoransky et al. | ......... | 15/159.1 |

* cited by examiner

*Primary Examiner* — Michael Jennings
(74) *Attorney, Agent, or Firm* — William Simmons; Simmons Patents

(57) ABSTRACT

The apparatus is a configurable cleaning apparatus which may utilize a one piece, removable, rotatable and reversible handle that revolves around a pivot lug located on the back of the apparatus body. The reversible and revolving handle utilizes a "Flex-Loc" system which provides at least two locking handle positions. One handle position provides for more power scrubbing of tougher surfaces such as tire walls. The other handle position provides a longer length for cleaning harder to reach areas. The variable handle provides the user customizable operating positions.

16 Claims, 12 Drawing Sheets

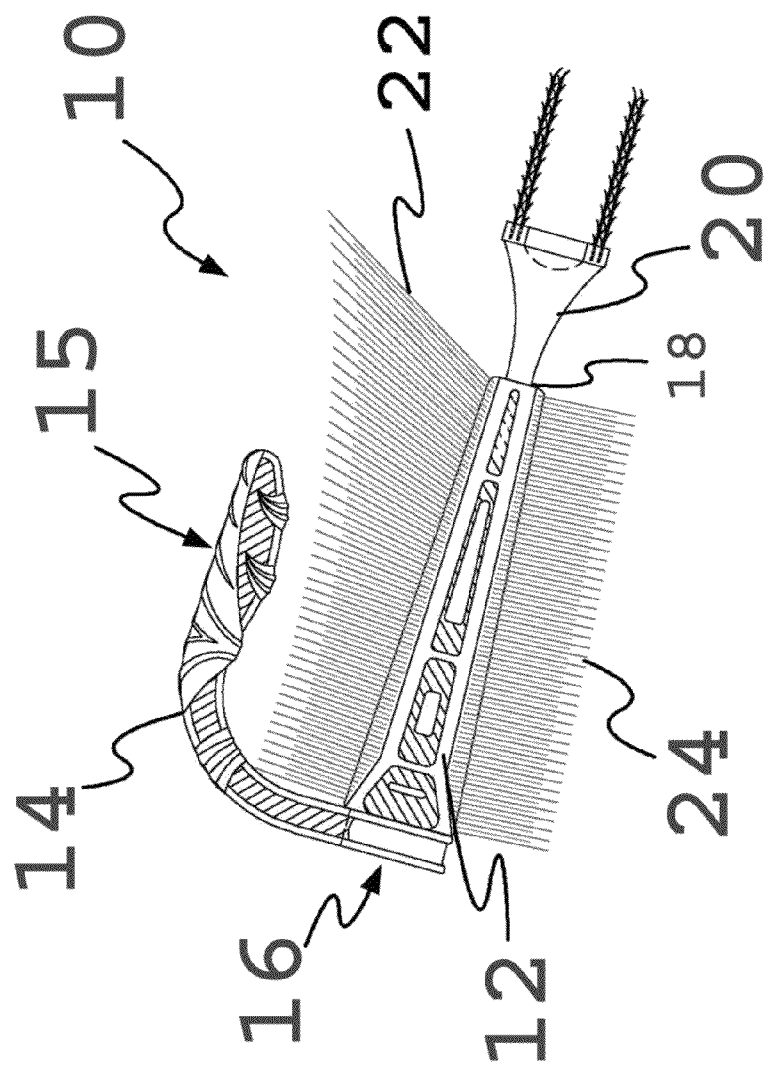

Soft Scrub with Enhanced Power

Soft Scrub with Enhanced Reach

Top View
Hard Scrub with Enhanced Reach

Top View
Soft Scrub with Enhanced Power

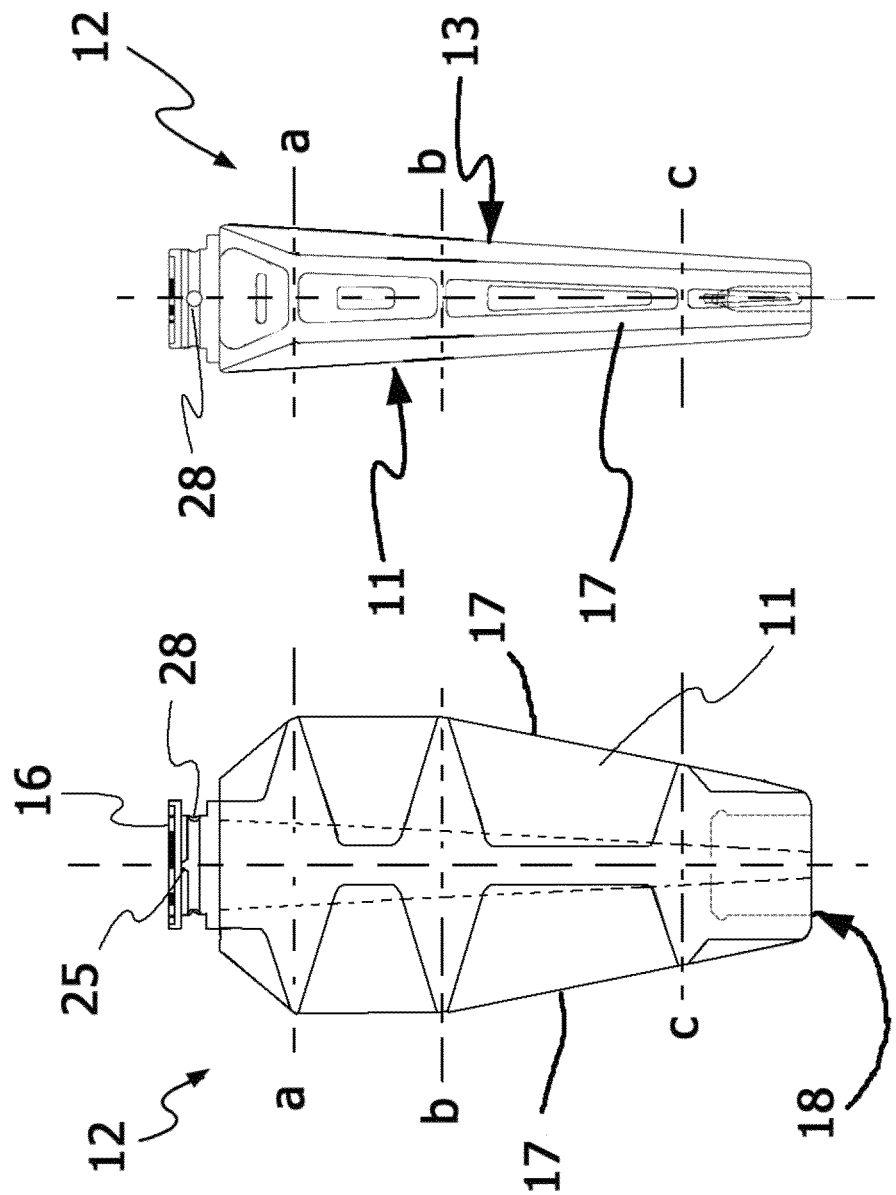

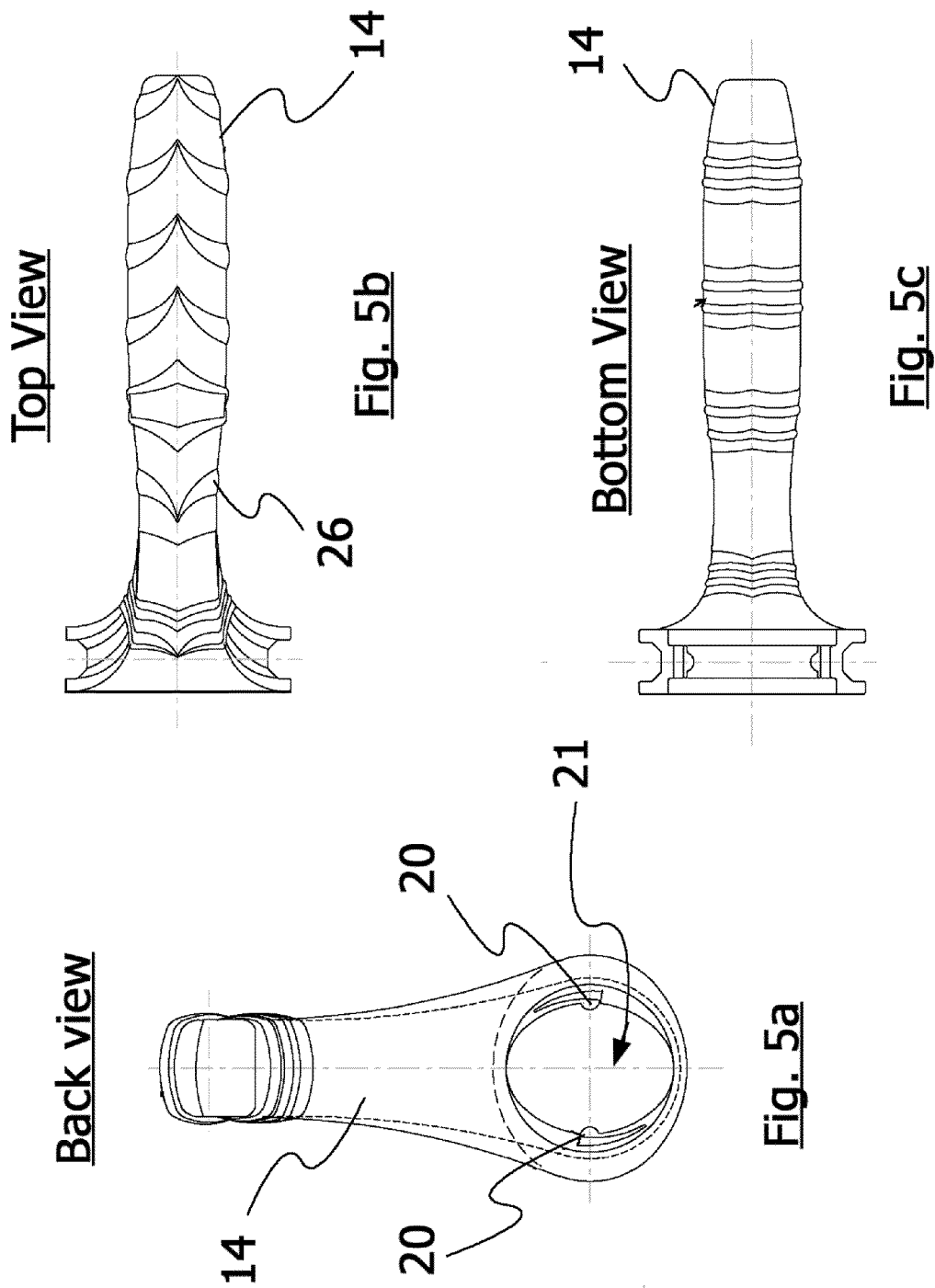

CONFIGURABLE CLEANING BRUSH

CLAIM TO PRIORITY

This application claims priority to U.S. Provisional Patent Application, 61/610,640, filed on 14 Mar. 2012, the entire contents of which are incorporated by this reference for all purposes and for all that it discloses.

TECHNICAL FIELD OF THE INVENTION

The present invention relates to ornamental and utilitarian features of a configurable cleaning brush for cleaning items and which is particularly well suited for cleaning the wheels associated with vehicles such as automobiles, motorcycles, trucks as well as the surfaces of water craft and airplanes.

BACKGROUND

A brush is a tool defining a work surface (such as bristles and filaments) that may be used in any of a plurality of activities such as cleaning, grooming, and painting. Most brushes are basic in design and the average household may contain several dozen varieties. Prior art brushes generally consist of a block (body) associated with filaments or bristles. Both the block and bristles/filaments are constructed from materials that have properties suitable for the anticipated environmental factors in which such brush will be used.

When it comes to cleaning vehicles, there are a multitude of prior art brushes available to perform various cleaning tasks. One area in particular where brushes are used relates to the cleaning of wheels. For the purposes of this document, a wheel is composed of a tire, rim, lug nuts, and perhaps a hubcap or other similar accessory. As is well known, an automobile tire (usually consisting of rubber) is mechanically associated with the outer diameter of a rim so that the combination defines an airtight association (although wheels sometimes comprise solid tires and other configuration no requiring an airtight association). Such rim is mechanically associated with a vehicle using a plurality of lug nuts which typically are inserted into lug nut recesses. For some configurations, a portion of the rim and/or lug nuts may be covered by a hub cap or other similar wheel accessory. Consequently, automobile wheels, for example, present a plurality of surfaces, surface depths, and material types that will require cleaning. To complicate the matter further, tires generally require more rigorous cleaning and scrubbing than do rims or hubcaps. Thus, some areas of a wheel will require a brush to provide more "power" while other areas of a wheel will require a softer brush with perhaps more "reach".

Due to the above, car tire and wheel cleaning can be one of the more arduous tasks in cleaning a vehicle and typically require the use of numerous prior art brushes. For example, a brush type comprising stiffer bristles might be needed for tire scrubbing while yet another brush type with softer bristles might be needed for rim cleaning. Using various numbers and types of brushes is expensive and inconvenient to maintain, keep track of and store.

Another challenge for a wheel cleaning brush relates to its shape and whether or not a brush cleaning surface can fit into the narrow and intricate recesses of the modern wheel configurations, especially for the more contemporary wheel designs. Further, lug recesses typically require relatively smaller brush designs. Thus, using prior art brushes, one will typically need to use a plurality of prior art brushes having different "reach" and "power" configurations as well as different bristle configurations when cleaning the various surfaces and components of vehicle wheels.

In this document, the Applicant discloses a configurable brush design comprising novel ornamental and utilitarian attributes that provide a plurality of bristles/filaments and handle configurations that, in turn, provide a plurality of abrasive properties as well as a plurality of "power" and "reach" configurations. Such a device can be used for a plurality of cleaning tasks (including cleaning components of motorcycles, trucks, water craft, airplanes and applications beyond motorized vehicles) and is particularly well suited for cleaning wheels comprising a tire, rim, lug nuts, and lug nut recesses, and other wheel accessories.

SUMMARY OF THE INVENTION

Objects and advantages of the invention will be set forth in the following description, or may be obvious from the description, or may be learned through practice of the invention.

Broadly speaking, a principal object of the present invention is to provide a configurable brush apparatus for cleaning where such brush comprises a brush body mechanically associated with a plurality of scrubbing members and further moveably associated with a handle.

Another general object of the present invention is to provide a configurable brush apparatus for cleaning items where such brush comprises a brush body mechanically associated with a plurality of scrubbing members and further comprising a removable, rotatable, reversible handle. The handle is associated with one end of the brush body and configured to revolve around a pivot lug located at the back of the brush body.

Yet another general object of the present invention is to provide a configurable brush apparatus for cleaning items and comprising a brush body associated with a brush handle, an accessory brush interface, wherein a first side of said brush body is mechanically associated with a plurality of scrubbing members of a first type and wherein a second side of said brush body is mechanically associated with a plurality of scrubbing members of a second type. The brush handle is removable, rotatable, and reversible and is associated with one end of the brush body and configured to revolve around a pivot lug located at the back of the brush body. The accessory interface is configured to receive a brush accessory including a lug brush, tread brush, spoke brush, and a hub brush.

Additional objects and advantages of the present invention are set forth in, or will be apparent to those skilled in the art from, the detailed description herein. Also, it should be further appreciated that modifications and variations to the specifically illustrated, referenced, and discussed steps, or features hereof may be practiced in various uses and embodiments of this invention without departing from the spirit and scope thereof, by virtue of the present reference thereto. Such variations may include, but are not limited to, substitution of equivalent steps, referenced or discussed, and the functional, operational, or positional reversal of various features, steps, parts, or the like. Still further, it is to be understood that different embodiments, as well as different presently preferred embodiments, of this invention may include various combinations or configurations of presently disclosed features or elements, or their equivalents (including combinations of features or parts or configurations thereof not expressly shown in the figures or stated in the detailed description).

Those of ordinary skill in the art will better appreciate the features and aspects of such embodiments, and others, upon review of the remainder of the specification.

BRIEF DESCRIPTION OF THE DRAWINGS

A full and enabling description of the present subject matter, including the best mode thereof, directed to one of ordinary skill in the art, is set forth in the specification, which makes reference to the appended figures, in which:

FIG. 1a is a side elevational view of one embodiment of brush (10) in a hard scrub with enhanced power configuration;

FIG. 4a is a top plan view of a surface of brush body (12);

FIG. 4b is a side elevational view of brush body (12);

FIG. 5a is a back elevational view of handle (14);

FIG. 5b is a top plan view of handle (14);

FIG. 5c is a bottom plan view of handle (14);

Figure 1B:
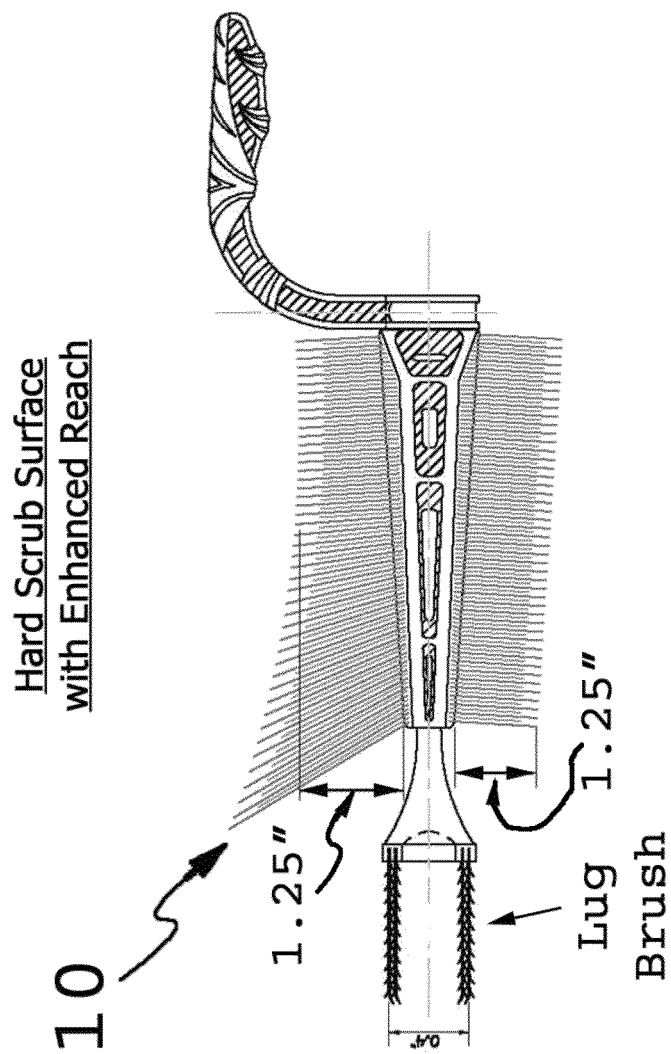
FIG. 1b is a side elevational view of one embodiment of brush (10) in a hard scrub with enhanced reach configuration.

Repeat use of reference characters throughout the present specification and appended drawings is intended to represent the same or analogous features or elements of the present technology.

DETAILED DESCRIPTION

Reference now will be made in detail to the embodiments of the invention, one or more examples of which are set forth below. Each example is provided by way of explanation of the invention, not limitation of the invention. Indeed, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent same or analogous features, elements or steps.

It is to be understood by one of ordinary skill in the art that the present discussion is a description of exemplary embodiments only, and is not intended as limiting the broader aspects of the present invention.

It should be appreciated that this document contains headings. Such headings are simply place markers used for ease of reference to assist a reader and do not form part of this document or affect its construction.

DEFINITIONS

For the purposes of this document two or more items are "mechanically associated" by bringing them together or into relationship with each other in any number of ways including a direct or indirect physical connection that may be releasable (snaps, rivets, screws, bolts, etc.) and/or movable (rotating, pivoting, oscillating, etc.).

A wheel is composed of a tire, a rim defining lug nut interfaces, and may further include lug nuts, hubcaps, or other similar accessories.

While the particulars of the present invention may be adapted for use in a plurality of cleaning tasks, the examples and embodiments in this document are directed to the cleaning of automobile wheels (including tires, rims, lug nuts, lug nut recesses/interfaces, and wheel accessories).

DESCRIPTION

Referring now to FIG. 1, FIG. 4a and FIG. 4b, one exemplary embodiment of a brush (10) according to certain aspects of the invention is presented. Brush (10) comprises a body section (12) defining a first surface (11, FIG. 4a) and an opposing second surface (13) with a peripheral edge (17, FIG. 4b) defined there between. Body section (12) further defines an accessory interface (18) at one end and a body interface (16) at an opposing handle end. As best seen in FIG. 1a-d, a first plurality of scrubbing members (22) are mechanically associated with the first surface (11) and a second plurality of scrubbing members (24) are mechanically associated with the second surface (13) of body section (12). The accessory interface (18) is configured for releasably receiving an accessory item (20). Similarly, body interface (16) is configured for releasably and moveably receiving handle (14).

As noted above, a first plurality of scrubbing members (22) are mechanically associated with the first surface (11) and a second plurality of scrubbing members (24) are mechanically associated with the second surface (13) of body section (12). For the currently preferred embodiment, the first plurality of scrubbing members (22) are configured to be "softer" compared to the second plurality of scrubbing members (24). For example, the first plurality of scrubbing members (22) may be constructed from a material that is less abrasive and/or may be less firm, and thus, less likely to cause scratches compared to the material and/or firmness used to construct the second plurality of scrubbing members (24). For such configuration, first surface (11) mechanically associated with the first plurality of scrubbing members (22) will be collectively referred to as the "soft scrub surface" (or side) of brush (10). Similarly, the second surface (13) mechanically associated with the second plurality of scrubbing members (24) will be referred to collectively as the "hard scrub surface" (or side) of brush (10).

Figure 3A:
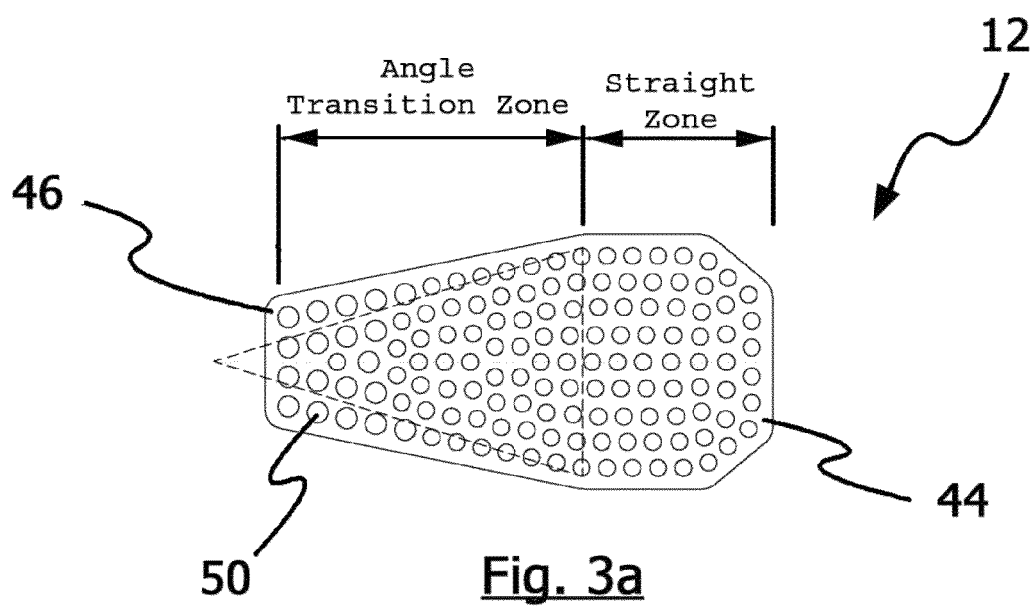
FIG. 3a is a top plan view of the soft scrub side of brush (10)
Figure 3B:
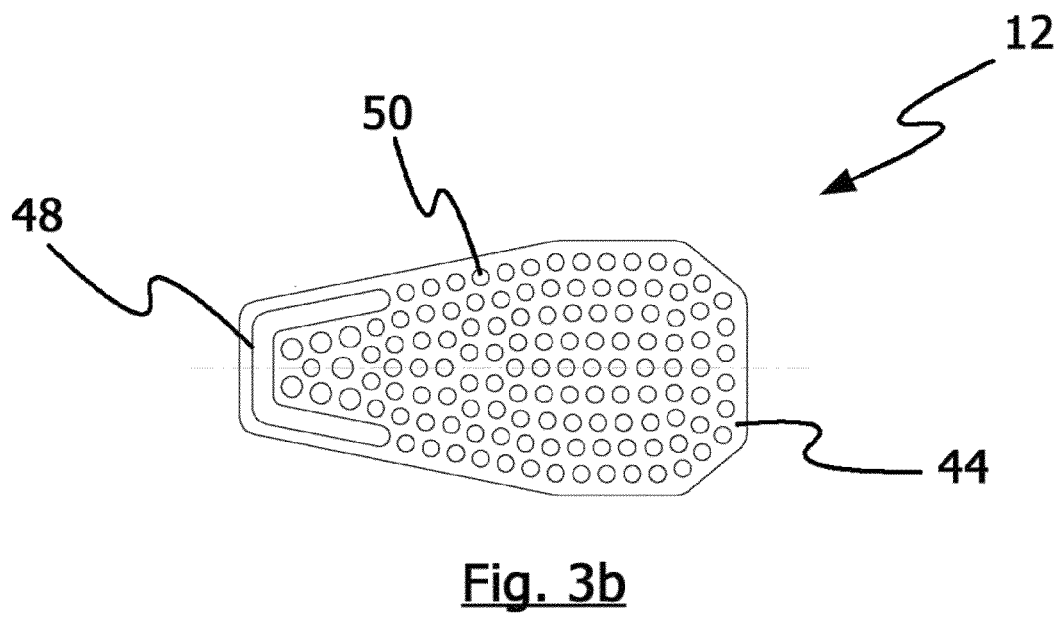
FIG. 3b is a top plan view of one alternative embodiment of the soft scrub side of brush (10)
Figure 3C:
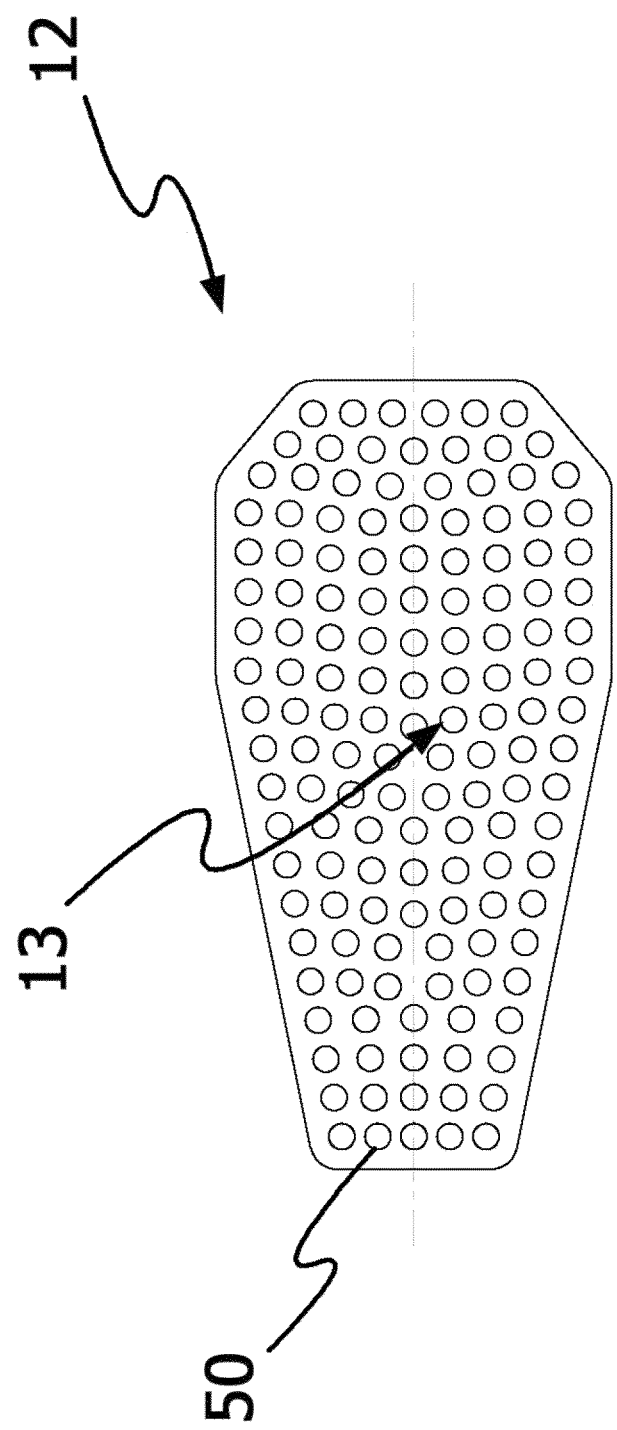
FIG. 3c is a top plan view of the hard scrub side of brush (10)

As best seen in FIG. 3a, FIG. 3b, and FIG. 3c, first surface (11) and second surface (13) are now considered in more detail. For the currently preferred embodiment, the outermost perimeter of first surface (11) and second surface (13) define a generally rectangular polygonal shape. FIG. 3c depicts one exemplary embodiment of a second surface (13) defining a plurality of scrubbing member receivers (50). Scrubbing member receivers (50) are configured for receiving or being mechanically associated with a plurality of scrubbing members (24). As noted above, for the preferred embodiment, scrubbing members (24) define a more abrasive or firmer cleaning surface ("harder") compared to the "softer" cleaning surface defined by the opposing soft scrub surface. One of ordinary skill in the art will appreciate that any number methods may be used to define a relatively harder cleaning surface including using different materials (compared to a "softer" surface) or using the same material but making such material more abrasive in configuration.

Referring now to the soft scrub surface of body section (12), as noted above, first surface (11) is configured to receive a plurality of first scrubbing members (22). As best seen in FIG. 3a, one exemplary embodiment of a first surface (11) is depicted defining a plurality of scrubbing member receivers (50). Scrubbing member receivers (50) are configured for receiving or being mechanically associated with a plurality of scrubbing members (22).

As depicted in FIG. 3a, the soft scrub surface of brush (10) defines two scrubbing areas. The first scrubbing area (44) comprises scrubbing members extending perpendicularly from the soft scrub surface of body section (12). A second scrubbing area (46) comprises scrubbing members extending angularly from the soft scrub surface of body section (12) and toward the accessory interface (18) thereby defining a "Cross-Matrix" configuration providing for longer scrubbing members angled to an apex. Such "Cross-Matrix" configuration is particularly well suited for directed cleaning of intricate and complicated wheel joint patterns.

For the currently preferred embodiment, all the scrubbing members (22) are constructed from the same material although embodiments were scrubbing members (22) are constructed from a plurality of materials with varying degrees of abrasive qualities fall within the scope and sprit of the invention. That said, generally speaking and as noted above, scrubbing members (22) are constructed from different material and/or are configured to provide a less abrasive surface compared to scrubbing members (24) thereby defining a relatively "softer" cleaning surface.

Similarly, for the currently preferred embodiment, all the scrubbing members (24) are constructed from the same material although embodiments were scrubbing members (24) are constructed from a plurality of materials with varying degrees of abrasive qualities fall within the scope and sprit of the invention. Further, scrubbing members (24) may or may not be constructed from the same material(s) as scrubbing members (22).

Suitable materials for scrubbing members (22) and scrubbing members (24) include bristles, filaments constructed from carbon fiber, ultra-high-molecular-weight polyethylene, metal fiber, and other suitable materials. Bristles/filaments covered with a pad, or pads alone, also fall within the scope of the present invention. In general, the raw materials used to construct the various components of brush (10) should be of adequate quality to achieve the intended design performance of the product and should withstand being submersed in water for extended periods of time and are preferably impervious to the detergents and degreasers associated with tire and wheel cleaners. Such materials should have a level of UV stabilizers sufficient enough to prevent deterioration of final form of molded plastic parts.

As noted above, preferably, each brush side shall have its own unique bristles stiffness. For one embodiment, the hard scrub surface comprises bristles of medium stiffness capable of scrubbing road grime off of tire walls and the soft scrub surface shall comprise relatively softer bristles that will not damage delicate wheel surfaces and finishes. The scrubbing members (22) and (24) shall be mechanically associated with its respective brush body surface using any suitable method including chemical bonding, thermal adhesion, or friction insets/inserts.

Figure 6B:
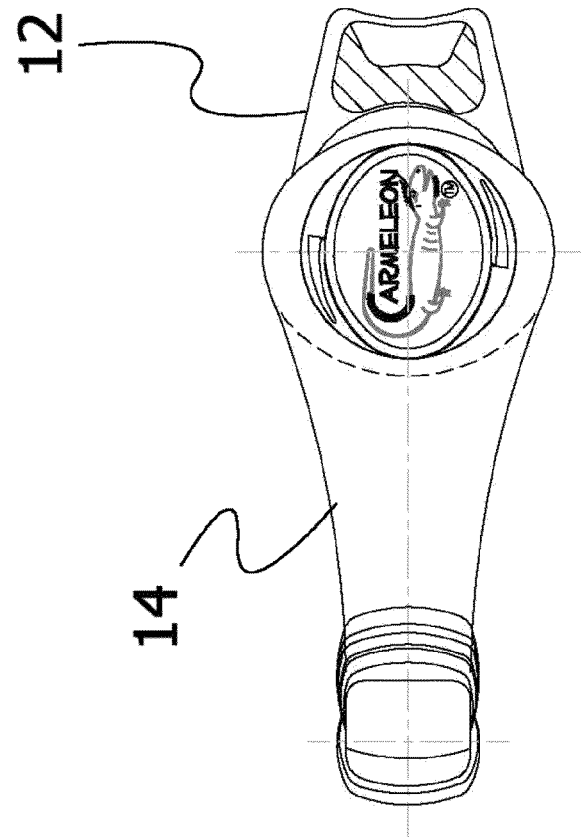
FIG. 6b is a back elevational view of handle (14) and brush body (12) in an disengaged position.
Figure 6A:
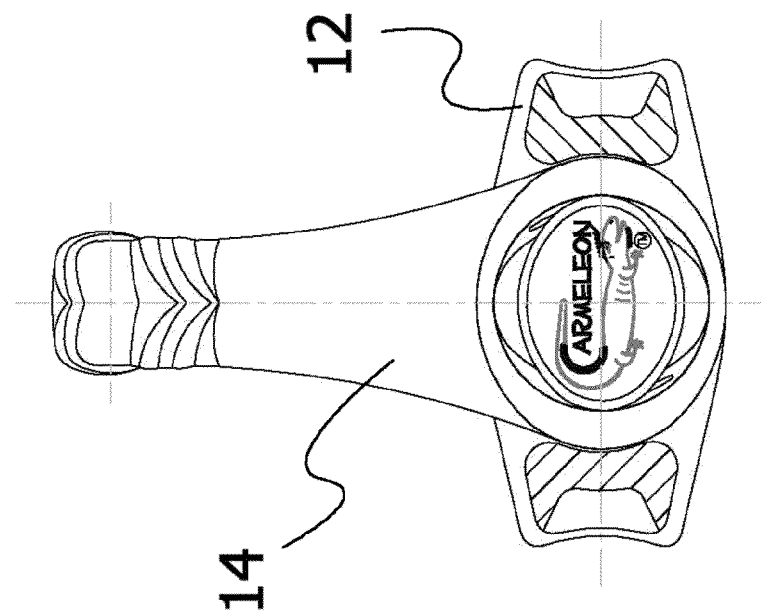
FIG. 6a is a back elevational view of handle (14) and brush body (12) in an engaged position.

Body section (12) is preferably made from a plastic material that will provide a durable platform for the cleaning demands of the brush for the intended surface while at the same time being resistant to damage from metal edges and corners. For one preferred embodiment, the color of body section (12) shall be green with a semi-gloss finish that may appear to change color (like a chameleon) based on environmental parameters such as viewing angle, light levels, and temperature. For example, the brush (10) components may be coated with Nano Paint that changes color in the presents of a magnetic field. Nano paint comprises Nano scale crystalline particles that are controlled using a low grade magnetic field which is used to affect the spacing of the colloidal Nano crystals and thereby controlling their ability to reflect light and change color. When the brush, covered with Nano paint, is not being held by a user's hand, it will have a default color; however, when picked up, the human hand will affect the magnetic field impinging the surface of the brush causing it to change color. Additionally, components of brush (10) may defined or be associated with a lenticular printing that changes based on viewing angle. Similarly, brush components, such as handle (14), may (or may not) be made from the same material as body section (12) and may include ornamental features such as images/icons as depicted in FIG. 6a and FIG. 6b.

To recap the above, first surface (11) with scrubbing members (22) are referred to collectively as the "soft scrub surface" and second surface (13) with scrubbing members (24) are referred to collectively as the "hard scrub surface" based on the anticipated relative abrasive properties of the relevant scrubbing members. One of ordinary skill in the art will appreciate that the "hard scrub" brush configurations are particularly well suited for cleaning tough, scratch resistant surfaces. For example, such hard scrub configurations would likely be more suitable for removing tire wall grime (see FIGS. 2a and 2b). Similarly, one of ordinary skill in the art will appreciate that the soft scrub brush configurations are particularly well suited cleaning more delicate surfaces, perhaps with finishes that are more prone to show scratches (such as rim surfaces).

Handle Positions

For the currently preferred embodiment, brush (10) is a configurable brush that utilizes a one piece, removable, rotatable and reversible handle (14) that revolves around a body interface (16) located at one end of body section (12). One suitable embodiment of a body interface (16) is a pivot lug defining a "Flex-Loc" system (described in more detail later) which provides at least four (4) locking handle positions and associated brush (10) configurations.

A first handle (14) position (FIG. 1a), referred to as the hard scrub with enhanced power position, is defined by handle (14) being associated with body interface (16) so that gripping region (15) points towards accessory interface (18) and further extends over the approximate center of body section (12) and oriented so that it is adjacent to the soft scrub surface so that the hard scrub surface becomes the brush (10) cleaning surface. Such a configuration is referred to as the hard scrub position with enhanced power as: (1) the hard scrub surface is the cleaning surface, and (2) applying downward force on gripping region (15) places a substantially equal downward force on the cleaning surface compare to other handle configurations.

A second handle (14) position (FIG. 1b and FIG. 1e), referred to as the hard scrub with enhanced reach configuration, is defined by handle (14) being associated with body interface (16) as described above for the first handle position with the exception that gripping region (15) points away from accessory interface (18). Such a configuration is referred to as the hard scrub position with enhanced reach as: (1) the hard scrub surface is the cleaning surface, and (2) the cleaning surface can reach surfaces further away from a user's hand compared to the "enhanced power" configurations.

Figure 1C:
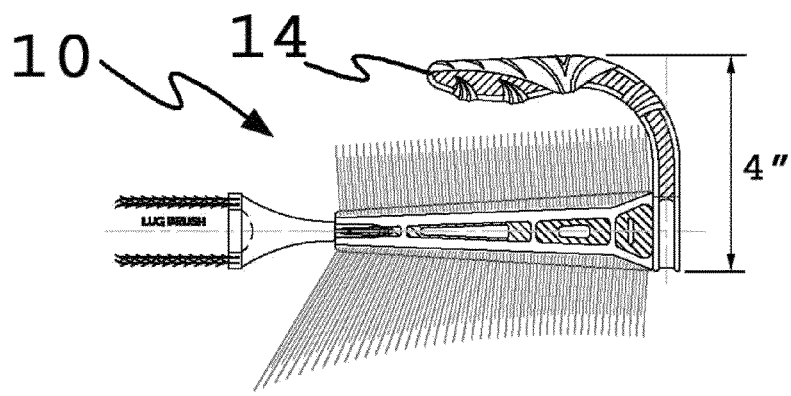
FIG. 1c is a side elevational view of one embodiment of brush (10) in a soft scrub with enhanced power configuration.
Figure 1D:
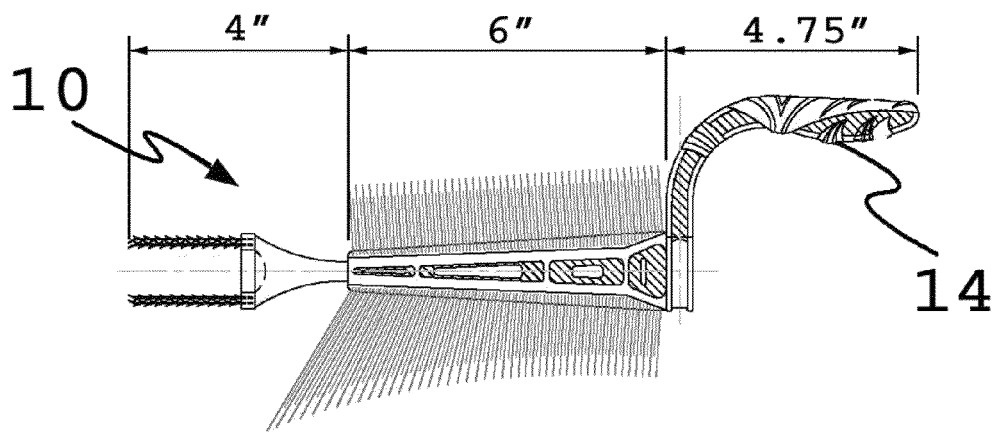
FIG. 1d is a side elevational view of one embodiment of brush (10) in a soft scrub with enhanced reach configuration.
Figure 1E:
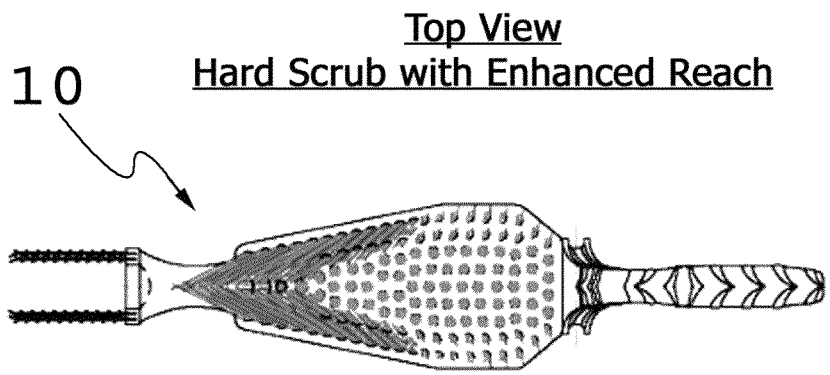
FIG. 1e is a top plan view of one embodiment of brush (10) in a hard scrub with enhanced reach configuration.
Figure 1F:
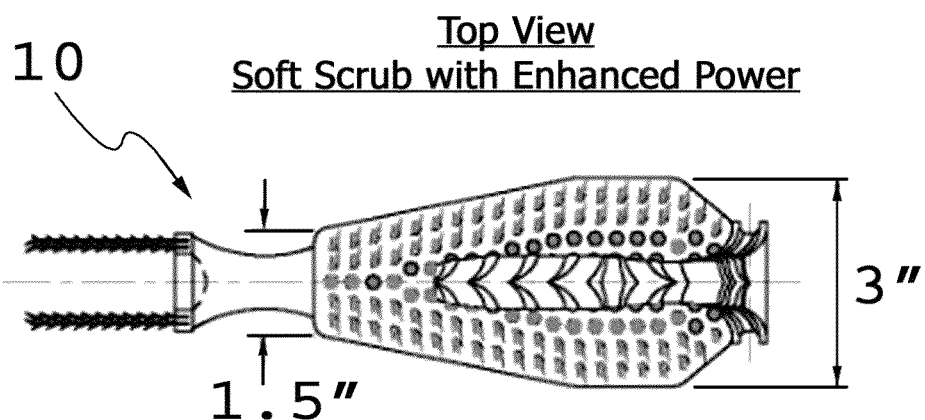
FIG. 1f is a top plan view of one embodiment of brush (10) in a soft scrub with enhanced power configuration.

Two "soft scrub" configurations are now considered. Referring now to FIG. 1c and FIG. 1f, handle (14) is associated with body interface (16) so that gripping region (15) points towards accessory interface (18) and further extends over the approximate center of body section (12) and adjacent to the hard scrub surface so that the soft scrub surface becomes the brush (10) cleaning surface. Such a configuration is referred to as the "soft scrub with enhanced power" as: (1) the soft scrub surface is the cleaning surface, and (2) applying downward force on gripping region (15) places a substantially equal downward force on the cleaning surface compare to other soft scrub handle configurations.

A forth handle (14) position (FIG. 1d), referred to as the soft scrub position with enhanced reach, is defined by handle (14) being associated with body interface (16) so that gripping region (15) points away from accessory interface (18). However, while the gripping region (15) of handle (14) will be on the same side of body section (12) as the hard scrub surface, the gripping region (15) of handle (14) will not be adjacent to body section (12). Such a configuration is referred to as the soft scrub position with enhanced reach as: (1) the soft scrub surface is the cleaning surface, and (2) the cleaning surface can reach surfaces further away from a user's hand compared to the "power scrub" configurations.

Figure 2B:
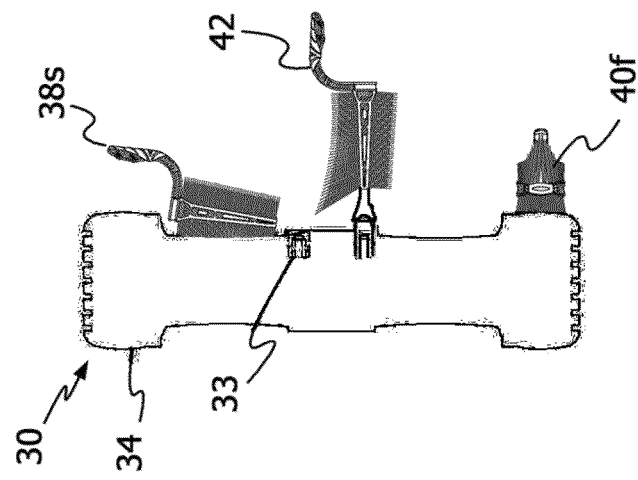
FIG. 2b presents a front view of a wheel and a side view of a brush (10) associated with such wheel in various cleaning positions.
Figure 2A:
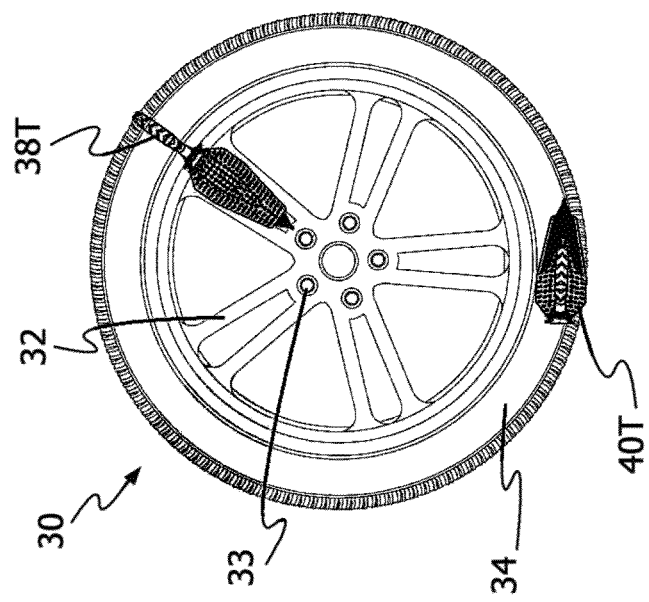
FIG. 2a presents a side view of a wheel and a top view of a brush (10) associated with such wheel in various cleaning positions.

FIG. 2a and FIG. 2b depict a wheel (30) comprising tire (34) mechanically associated around the peripheral edge of rim (32) to form an airtight configuration there between. Wheel (30) is mechanically associated with a vehicle using lug nuts (33) which may be inserted into the lug nut recesses defined by rim (32). Exemplary hard scrub and soft scrub applications (e.g. cleaning the side wall of a tire and the wheel rim) are depicted in FIG. 2a and FIG. 2b; hard scrub top view (40T), hard scrub front view (40f), soft scrub top view (38T) and soft scrub side view (38s). Further, FIG. 2b depicts a lug nut cleaner (42) application where a lug nut cleaning accessory item (20) is shown cleaning lug nuts (33).

Handle—Body Flex Loc System

As noted above, one suitable embodiment of a handle interface (16) is a pivot lug defining a "Flex-Loc" system which provides at least four (4) locking handle positions. As best seen in FIG. 5a, FIG. 5b, and FIG. 5c, handle (14) defines a handle flex loc interface (21) comprising two opposing flex loc members (20). Similarly, as best seen in FIG. 4a and FIG. 4b, body interface (16) defines a body flex loc interface comprising two opposing female flex loc members (28) configured to receive the male flex loc members (20). Additionally, body interface (16) further defines disengage groves (25) configured for receiving the male flex loc members (20).

When the male flex loc members (20) are associated with the female flex loc members (28), handle (14) is said to be in the engaged position in one of the four (4) handle positions described above. When the male flex loc members (20) are in alignment with and received by disengaged groves (25), handle (14) is said to be in the disengaged position and may be removed from body section (12). Thus, handle (14) may be pivoted or rotated about body interface (16) by applying sufficient angular force to handle (14) while holding body section (16) thereby alternating between the soft scrub configuration and the hard scrub configuration (i.e. by rotating handle (14) 180 degrees). Additionally, by placing handle (14) in the disengaged position, it may be removed from body section (12) and "flipped" around to alternate between the "enhanced power" and "enhanced reach" positions (i.e. to alternate between the positions where handle (14) points toward the accessory interface (18) or away from the accessory interface (18)).

Accessory Items

Figure 7A:
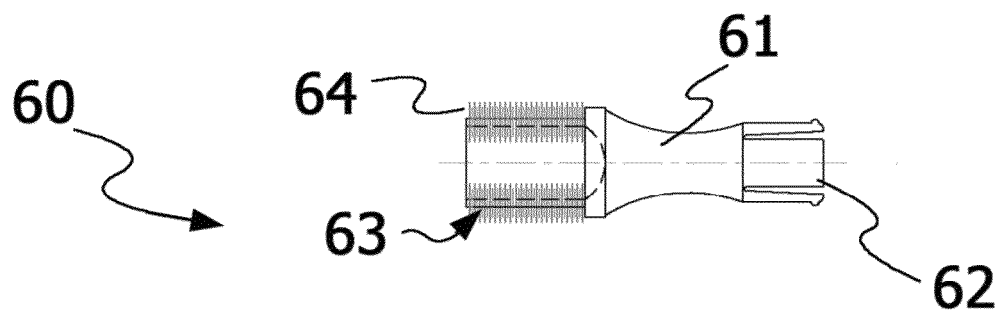
FIG. 7a is a top plan view of one exemplary lug brush accessory item with normal bristles.
Figure 7B:
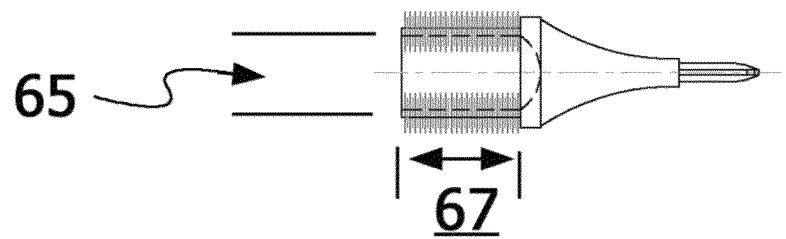
FIG. 7b is a side elevational view of one exemplary lug brush accessory item with normal bristles.
Figure 8A:
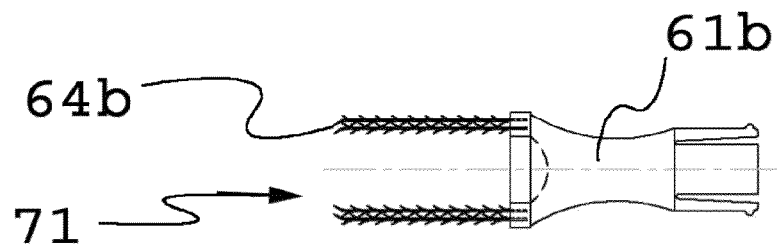
FIG. 8a is a top plan view of one exemplary lug brush accessory item with barbed bristles.
Figure 8B:
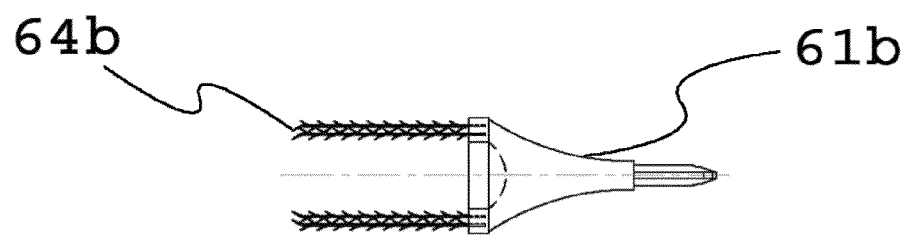
FIG. 8b is a side elevational view of one exemplary lug brush accessory items with barbed bristles.
Figure 8C:
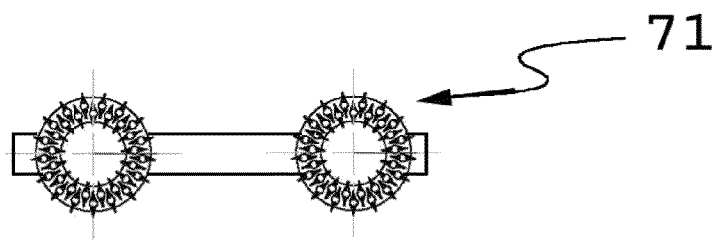
FIG. 8c is an end elevational view of one exemplary lug brush accessory items with barbed bristles looking into the bristle end of the accessory.

As noted above, brush (10) comprises a body section (12) with an accessory interface (18) defined at one end. Accessory interface (18) is configured to receive any number of accessory items (20). One exemplary accessory item (20) is lug brush with long bristles (60) as depicted in FIG. 7a and FIG. 7b. Lug brush (60) comprises a lug brush body (61) defining a lug brush interface (62) at one end and a cleaning member (63) at an opposing end. The lug brush interface (62) is configured for being mechanically associated with the accessory interface (18) defined by body section (12). Cleaning member (63) further defines lug scrubbers (64). For one preferred embodiment, lug scrubbers (64b) define a staggered array of barbed bristles (FIG. 8a, FIG. 8b, FIG. 8c). Cleaning member (63) further defines an inner void having a lug brush void width (65) and a lug brush void depth (67). Preferably, the lug brush void width (65) is about the same diameter of the lug nut to be cleaned. Notably, while there are numerous automobile manufactures that manufacturer a plurality of automobile models and sizes, lug nuts are typically universal in size. Similarly, the lug brush void depth (67) is slightly greater in length than a lug nut to be cleaned so that cleaning member (63) may be inserted into a lug nut recess and around a lug nut (see lug nut cleaner (42), FIG. 2b).

Any number of accessory items (20) may be configured for being used with brush (10) including spoke cleaners, chain cleaners, and vent cleaners.

While the present subject matter has been described in detail with respect to specific embodiments thereof, it will be appreciated that those skilled in the art, upon attaining an understanding of the foregoing may readily adapt the present technology for alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. A cleaning apparatus comprising:
   a body section defining a first surface and an opposing second surface with a peripheral edge defined there between wherein said body section defines an accessory interface at one end and a body interface at an opposing second end;
   wherein said accessory interface is configured for releasably receiving an accessory item and wherein said body interface is configured for releasably and moveably receiving a handle wherein the body interface comprises a pivot lug defining two opposing female flex-loc members;
   a first plurality of scrubbing members mechanically associated with said first surface;
   a second plurality of scrubbing members mechanically associated with said second surface; and
   a handle defining a handle body that is generally cylindrical defining a gripping region and a handle interface region, said handle interface region defining a handle interface comprising a pivot lug receiver comprising two male flex-lock members so that the handle interface to body interface association defines a flex-loc system that provides at least two locking positions and wherein the handle body is curved so that said gripping region is perpendicular to said handle interface region and wherein said handle interface is movably associated with said body interface.

2. A cleaning apparatus as in claim 1, wherein said first plurality of scrubbing members define a medium stiffness suitable for cleaning road grim from tire walls.

3. A cleaning apparatus as in claim 1, wherein said first surface and said opposing second surface define flat surfaces wider than said peripheral edge.

4. A cleaning apparatus as in claim 3, wherein said handle is removable from said brush.

5. A cleaning apparatus as in claim 4, wherein said handle is reversible to define a first enhanced power configuration and a second enhanced reach configuration.

6. A cleaning apparatus as in claim 1, wherein said first plurality of scrubbing members define a first material and wherein the second said second plurality of scrubbing members define a second material.

7. A cleaning apparatus as in claim 6, wherein said first material is at least one of (a) less abrasive, and (b) less stiff compared to said second material.

8. A cleaning apparatus as in claim 7, wherein said first surface defines a flat surface and wherein said first material defines a soft scrub brush side and wherein said second surface defines a flat surface and wherein the second material defines a hard scrub brush side.

9. A cleaning apparatus as in claim 1, further comprising an accessory item associated with said accessory interface.

10. A cleaning apparatus as in claim 9, wherein said accessory item is a lug brush.

11. A cleaning apparatus is in claim 10, wherein said lug brush defines a staggered array of barged bristles.

12. A brush for cleaning wheels, said brush comprising:
    a body section defining a first surface and an opposing second surface separated by a peripheral edge wherein said body section defines a body interface at one end wherein said body interface comprises a pivot lug defining two opposing female flex-loc members;
    a first plurality of scrubbing members mechanically associated with said first surface;
    a second plurality of scrubbing members mechanically associated with said second surface;
    a handle defining a handle interface movably associated with said body interface wherein said handle interface comprises a pivot lug receiver comprising two male flex-lock members configured for being associated with said female flex-loc members so that the handle interface to body interface association defines a flex-loc system that provides at least two locking positions for said handle;
    wherein said body section further defines an accessory interface at the end opposing said body interface wherein said accessory interface is releasably mechanically associated with accessory item and; wherein said handle defines a handle body that is generally cylindrical defining a gripping region and a handle interface region comprising said handle interface and wherein said handle body is curved so that said gripping region extends perpendicularly away from said handle interface region.

13. A brush for cleaning wheels as in claim 12, wherein said handle is removable from said brush and reversible to define a first enhanced power configuration and a second enhanced reach configuration.

14. A brush for cleaning wheels as in claim 12, wherein said accessory item is a lug brush defining a staggered array of barged bristles.

15. A brush for cleaning surfaces, said brush comprising:
    a body section defining a first surface and an opposing second surface separated by a peripheral edge, said peripheral edge defining two opposed side sections and two opposed end sections and wherein a body interface is defined by one end section and an accessory interface is defined by the opposing end section and wherein said body interface comprises a pivot lug defining two opposing female flex-loc members;
    a first plurality of scrubbing members mechanically associated with said first surface;
    a second plurality of scrubbing members mechanically associated with said second surface; and
    a handle defining a handle interface comprising two opposing male flex-loc members, said handle interface movably associated with said body interface;
    wherein said first surface and said opposing second surface define a flat surface and wherein said handle interface comprises a pivot lug receiver configured for being associated with said female flex-loc members so that the handle interface to body interface association defines a flex-loc system that provides at least two locking positions for said handle; and
    wherein said handle defines a handle body that is generally cylindrical defining a gripping region and a handle interface region wherein said handle interface region further defines said handle interface and wherein said handle body is curved so that said gripping region extends perpendicularly away from said handle interface region.

16. A brush for cleaning wheels as in claim 15, wherein said handle is removable from said brush and reversible to define a first enhanced power configuration and a second enhanced reach configuration and wherein said accessory interface is releasably mechanically associated with an accessory item defining a lug brush defining a staggered array of barged bristles.

* * * * *